(12) United States Patent
Yoshimoto et al.

(10) Patent No.: US 8,523,226 B2
(45) Date of Patent: Sep. 3, 2013

(54) COUNTERWEIGHT

(75) Inventors: Minoru Yoshimoto, Sakura (JP);
Yasuhide Higo, Sakura (JP); Eichi Manabe, Sakura (JP); Wataru Kataoka, Hirakata (JP); Kazuya Kuriyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 208 days.

(21) Appl. No.: 12/993,669

(22) PCT Filed: May 20, 2009

(86) PCT No.: PCT/JP2009/059282
§ 371 (c)(1),
(2), (4) Date: Jan. 12, 2011

(87) PCT Pub. No.: WO2009/142243
PCT Pub. Date: Nov. 26, 2009

(65) Prior Publication Data
US 2012/0003071 A1     Jan. 5, 2012

(30) Foreign Application Priority Data

May 23, 2008   (JP) .................................. 2008-135959

(51) Int. Cl.
*B66C 23/72*     (2006.01)
*E02F 9/18*      (2006.01)

(52) U.S. Cl.
USPC ........... 280/759; 414/719; 212/195; 106/713; 106/738; 106/816

(58) Field of Classification Search
USPC ..... 280/758; 414/719; 212/195; 106/31.05, 106/400, 713, 738, 739, 784, 816
See application file for complete search history.

(56) References Cited

U.S. PATENT DOCUMENTS 3,485,383 A * 12/1969 Beduhn .......................... 212/195
4,252,763 A *  2/1981 Padgett ......................... 264/133
(Continued)

FOREIGN PATENT DOCUMENTS

| CN | 101066857 | 11/2007 |
| JP | 06-034437 Y2 | 9/1994 |

(Continued)

OTHER PUBLICATIONS

Y. Kamiyama, et al., "Applying iron-ore from Republic of Chile to aggregate for heavyweight concrete," Architectural Institute of Japan, Sep. 8, 1983, pp. 71 and 72 (Concise English explanation enclosed).*

(Continued)

*Primary Examiner* — Paul N Dickson
*Assistant Examiner* — Barry Gooden, Jr.
(74) *Attorney, Agent, or Firm* — Posz Law Group, PLC

(57) ABSTRACT

Disclosed is a counterweight which is filled with a heavy-weight concrete containing, instead of currently used iron ores, a heavy-weight aggregate that scarcely causes the material segregation from cement paste and which can be produced at a low cost and is effectively enhanced in the filling factor of heavy-weight concrete into a case. A counterweight 6 comprises a case 62 and heavy-weight concrete filled therein, wherein the heavy-weight concrete contains a heavy-weight fine aggregate containing 20 mass % or more of aggregate particles having particle diameters of less than 0.15 mm and 20 mass % or more of aggregate particles having particle diameters of 2.5 mm to less than 5 mm.

10 Claims, 4 Drawing Sheets

(56) References Cited

U.S. PATENT DOCUMENTS

| | | | |
|---|---|---|---|
| 4,264,060 A * | 4/1981 | Twyman | 266/87 |
| 4,703,713 A * | 11/1987 | Gago et al. | 118/19 |
| 6,296,436 B1 * | 10/2001 | Ramun | 414/719 |
| 6,533,319 B1 * | 3/2003 | Denby et al. | 280/759 |
| 7,152,883 B2 * | 12/2006 | Niemela | 280/759 |
| 7,326,478 B2 * | 2/2008 | Bouscal et al. | 428/703 |
| 7,328,863 B2 * | 2/2008 | Nakajima et al. | 241/24.14 |
| 7,618,062 B2 * | 11/2009 | Hamm et al. | 280/759 |
| 2004/0164537 A1 * | 8/2004 | Niemela | 280/759 |
| 2005/0111954 A1 * | 5/2005 | Nakajima et al. | 414/719 |
| 2010/0290883 A1 * | 11/2010 | Kitatani et al. | 414/719 |
| 2011/0073016 A1 * | 3/2011 | Yoshimoto et al. | 106/816 |
| 2011/0226163 A1 * | 9/2011 | Yoshimoto et al. | 106/736 |

FOREIGN PATENT DOCUMENTS

| | | | |
|---|---|---|---|
| JP | 2006273654 A | * | 10/2006 |
| JP | 2008-106564 A | | 5/2008 |

OTHER PUBLICATIONS

Kilincarslan, The effect of barite rate on some physical and mechanical properties of concrete, Materials Science and Engineering: A vol. 424, Issues 1-2, May 25, 2006, pp. 83-86.*

Y. Kamiyama, et al., "Chile-san Jitekkoseki no Juryo Concrete-yo Kotsuzai e Tekiyo ni Tsuite," *Architectural Institute of Japan Taikai Gakujutsu Koen Kogaishu*, 1983, pp. 71 and 72 (Concise English explanation of relevance enclosed).

K. Shiraishi, et al., "Hoshasen Shaheiyo Concrete ni Kansuru Kenkyu (6th report): Kakushu Juryo Kotsuzai no Seishitsu," *Architectural Institute of Japan Kenkyu Hokoku*, 1957, pp. 91-94 (Concise English explanation of relevance enclosed).

International Search Report mailed on Jul. 14, 2009 for the corresponding International patent application No. PCT/JP2009/059282.

Office Action dated Oct. 8, 2012 in corresponding CN Application No. 200980118843.9.

* cited by examiner

COUNTERWEIGHT

CROSS REFERENCE TO RELATED APPLICATIONS

This application is a U.S. national stage application of PCT/JP2009/059282 filed on May 20, 2009, and claims priority to, and incorporates by reference, Japanese Patent Application No. 2008-135959 filed on May 23, 2008.

TECHNICAL FIELD

The present invention relates generally to a counterweight configured to be filled with heavy-weight concrete, and particularly to a counterweight to be suitably used for construction machineries, such as hydraulic shovels.

BACKGROUND ART

FIG. 2 shows a hydraulic shovel which comprises a lower base carrier 1 and an upper revolving superstructure 2 provided rotatably on the lower base carrier 1. The upper revolving superstructure 2 is provided with a turning frame 3 on which an operator cab 4, a machinery housing 5 and a counterweight 6 are equipped. A working machine 7 is provided at the front portion of the turning frame 3 so as to be capable of looking up-and-down motion. The working machine 7 is configured of a boom 8, an arm 9 and a bucket 10 thereby to perform excavation operation for the earth and sand, and the like. As shown in FIG. 1, the counterweight 6 is formed as a hollow case 62 having a concrete filling opening 61 at the top surface thereof. Weight adjusting materials, such as iron pieces, concrete, heavy-weight concrete and the like are to be filled into the case 62 to a certain weight, thereby adjusting the weight balance of the upper revolving superstructure 2 for the working machine 7.

Such heavy-weight concrete to be filled in the counterweight 6 is intended to mean concrete with larger mass per unit volume using a heavy-weight aggregate with larger specific gravity than that of aggregate used for usual concrete. Known as such heavy-weight concrete to be filled in the counterweight 6 may, for example, be concrete mixed therein with substances having large specific gravity, such as ores, iron scraps and the like (refer to Patent Document 1).

In general, in order to ensure a certain liquidity (flowability) and workability of concrete, the slump value may be increased by increasing unit water amount for concrete. However, it is known that, if unit water amount for heavy-weight concrete to be filled into the case 62 of counterweight 6 is increased, then the filling factor of heavy-weight concrete to the case 62 is decreased, because the density of heavy-weight concrete decreases and material segregation occurs between the heavy-weight aggregate and cement paste due to sedimentation of the heavy-weight aggregate. For this reason, as the heavy-weight concrete to be filled into the case 62 of counterweight 6, heavy-weight concrete of thick consistency may be generally used, which has a small slump value due to decreased unit water amount. Thus, the counterweight 6 is produced through filling such heavy-weight concrete into the case 62 and thereafter performing vibration forming thereof.

As heavy-weight aggregates to be used for such heavy-weight concrete, artificial heavy-weight aggregates such as ion scraps and natural heavy-weight aggregates such as magnetite, hematite and iron sand have been conventionally used. As well as having large density difference with cement paste, these heavy-weight aggregates, particularly iron ores such as magnetite and hematite, have relatively course particle size distributions, and therefore the viscosity of concrete tends to become lower when using such ion ores as the heavy-weight aggregates. Thus, problems in the conventional heavy-weight concrete include that heavy-weight aggregates having larger particle diameters settle down in cement paste to be separated from the cement paste at the time of vibration forming thereby decreasing the filling factor of heavy-weight concrete into the case 62 of counterweight 6.

In order to solve such problems, there has been proposed a heavy-weight concrete containing, in 1 $m^3$ of concrete, 20 to 60 kg of ultrafine powder derived from iron ores (refer to Patent Document 2).

PRIOR ART DOCUMENTS

Patent Documents

[Patent Document 1] Japanese Published Patent Application No. 2008-106564
[Patent Document 2] Japanese Published Patent Application No. 7-25654

DISCLOSURE OF THE INVENTION

The invention described in the above Patent Document 2 is intended to suppress the material segregation between heavy-weight aggregates and cement paste by using specific iron ores as heavy-weight aggregates. However, because escalating iron ores prices due to shortage of iron resources in recent years cause the production cost of heavy-weight concrete to be increased, the production cost of a counterweight may also be increased.

Given the foregoing problems, an object of the present invention is to provide a counterweight which is filled with a heavy-weight concrete using, instead of currently used iron ores, a heavy-weight aggregate that scarcely causes the material segregation from cement paste and which can be produced at a low cost and is effectively enhanced in the filling factor of heavy-weight concrete into a case.

In order to solve the above problems, the present invention provides a counterweight comprising a case and a heavy-weight concrete filled in the case, wherein the heavy-weight concrete contains at least a heavy-weight fine aggregate, and the heavy-weight fine aggregate contains 20 mass % or more of aggregate particles having particle diameters of less than 0.15 mm and 20 mass % or more of aggregate particles having particle diameters of 2.5 mm to less than 5 mm (Invention 1).

In general, it is considered that preferred is to use fine aggregate for concrete without eccentricity in particle size distribution in order that desired workability and strength could be achieved in spite of less cement quantity, and specifically to use fine aggregate with the particle size distribution prescribed in JIS-A5005. On the contrary, the above invention (Invention 1) has features including that the heavy-weight fine aggregate in the heavy-weight concrete has a particle size distribution where aggregate particles (fine particle components) having particle diameters of less than 0.15 mm eccentrically stand while aggregate particles (coarse particle components) having particle diameters of 2.5 mm to less than 5 mm also eccentrically stand. The features provide advantages that the material segregation is prevented from occurring at the time of mixing into concrete and that a sufficient mass per unit volume can be obtained for heavy-weight concrete, thereby providing a counterweight improved in the filling factor of heavy-weight concrete. In addition, the feature that the heavy-weight concrete contains 20 mass % or more of aggregate particles having particle diameters of 2.5 mm to less than 5 mm enables to ensure the flowability of the heavy-weight concrete during the vibration forming, thereby providing a good workability and enabling to fill the heavy-weight concrete into every corners of the case of counterweight during the vibration forming.

In the present invention, particle diameters of aggregate particles are defined as to whether or not to pass through a sieve of certain nominal dimension. For example, aggregate particles having particle diameters of less than 0.15 mm are intended to mean aggregate particles which may pass through a sieve of nominal dimension of 0.15 mm, while aggregate particles having particle diameters of 2.5 mm to less than 5 mm are intended to mean aggregate particles which may pass through a sieve of nominal dimension of 5 mm but may not pass through a sieve of nominal dimension of 2.5 mm. In addition, a heavy-weight aggregate (heavy-weight coarse aggregate, heavy-weight fine aggregate) used in the present invention is intended to mean an aggregate having density of 3.5 g/cm$^3$ or more.

In the above invention (Invention 1), it is preferred that the heavy-weight concrete further contains a heavy-weight course aggregate, and the heavy-weight fine aggregate and the heavy-weight coarse aggregate contain 5 mass % or more of fine aggregate particles having particle diameters of less than 0.075 mm (Invention 2).

The above invention (Invention 2) has an additional feature that the heavy-weight aggregates (the heavy-weight fine aggregate and the heavy-weight coarse aggregate) contain 5 mass % or more of fine aggregate particles having particle diameters of less than 0.075 mm. According to the additional feature, the viscosity of the concrete paste may be increased or improved and the density of the paste may be increased thereby decreasing the density difference with the density of aggregate particles (aggregate particles having particle diameters of 0.075 mm or more) (density difference: 2.5 g/cm$^3$ or less). Consequently, it is enabled to suppress more effectively the material segregation in the heavy-weight concrete, and therefore an improved counterweight may be provided in which the filling factor of heavy-weight concrete into the case is furthermore increased.

In the above invention (Invention 1, Invention 2), it is preferred that a whole or a part of the heavy-weight fine aggregate and the heavy-weight coarse aggregate is barite (Invention 3). Fine aggregate obtained by crushing a specific barite has a particle size distribution where coarse particle components and fine particle components eccentrically stand. Therefore, according to the invention (Invention 3), heavy-weight aggregates capable of inhibiting the material segregation from occurring in a heavy-weight concrete may be produced only by simply crushing barite without performing a specific particle size adjustment so as to have a certain fine aggregate particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more). As a result, the production costs of heavy-weight aggregates and heavy-weight concrete may be decreased thereby also decreasing the production cost of counterweight.

Also in the above invention (Invention 1, Invention 2), it is preferred that the heavy-weight fine aggregate and the heavy-weight coarse aggregate are obtained by crushing barite such that the maximum particle diameter becomes to be within the range of 20 mm to 70 mm (Invention 4).

According to the above invention (Invention 4), heavy-weight aggregates may be easily produced by crushing barite such that the maximum particle diameter becomes to be within the range of 20 mm to 70 mm without performing a specific particle size adjustment, so as to have a certain fine aggregate particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more). As a result, the production costs of heavy-weight aggregates and heavy-weight concrete may be decreased thereby also decreasing the production cost of counterweight.

In the above invention (Invention 3, Invention 4), it is preferred that an average tensile strength of aggregate particles having particle diameters of 9 mm to 11 mm to be obtained by crushing the barite is within a range of 4.0 N/mm$^2$ to 10.0 N/mm$^2$ (Invention 5). If an average tensile strength of the aggregate particles having diameters of 9 mm to 11 mm to be obtained from barite is within the above numerical range, then heavy-weight aggregates may be easily obtained by only crushing barite at the time of producing aggregate particles so as to have a desired fine aggregate particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more). Consequently, a specific particle size adjustment may be omitted, and the production cost of heavy-weight aggregates may be decreased thereby also decreasing the production cost of counterweight.

In the above invention (Invention 1 to Invention 5), it is preferred that the water-cement ratio of the heavy-weight concrete is within the range of 30% to 60% (Invention 6). According to the invention (Invention 6), such water-cement ratio within the above range ensures the workability of the heavy-weight concrete.

According to the present invention, it is possible to provide a counterweight which is filled with a heavy-weight concrete using, instead of currently used iron ores, a heavy-weight aggregate that scarcely causes the material segregation from cement paste.

BEST MODE FOR CARRYING OUT THE INVENTION

Hereinafter, a counterweight according to an embodiment of the present invention will be described in detail.

Figure 1:
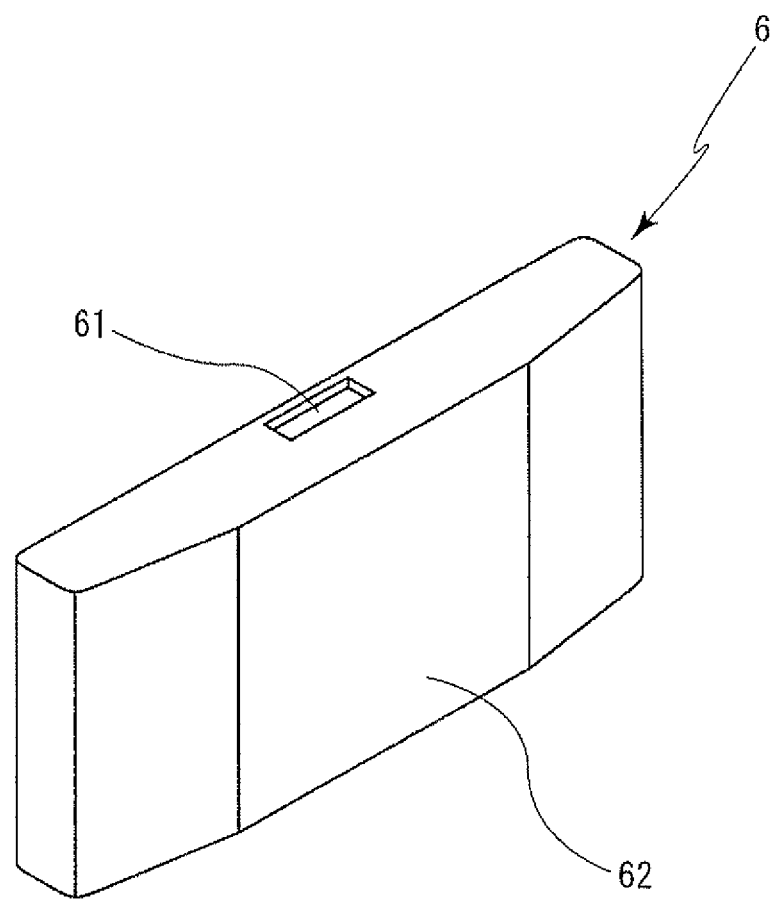
FIG. 1 is a perspective view illustrating a counterweight according to an embodiment of the present invention.

As shown in FIG. 1, the embodiment involves a counterweight 6 which comprises a case 62 and a heavy-weight concrete filled in the case 62. The case 62 has a concrete filling opening 61 at the top surface thereof. The heavy-weight concrete contains heavy-weight aggregates having a certain particle size distribution, and is filled into the case 62 through the opening 61.

The heavy-weight concrete contains at least a heavy-weight fine aggregate, and may further contain a heavy-weight coarse aggregate and water. The heavy-weight fine aggregate contains 20 mass % or more of aggregate particles having particle diameters of less than 0.15 mm and 20 mass % or more of aggregate particles having particle diameters of 2.5 mm to less than 5 mm, and preferably contains 20 mass % or more of aggregate particles having particle diameters of less than 0.15 mm and 25 mass % or more of aggregate particles having particle diameters of 2.5 mm to less than 5 mm.

The feature that the content percentage of aggregate particles having particle diameters of less than 0.15 mm is 20 mass % or more allows the heavy-weight concrete to efficiently inhibit a material segregation from occurring between cement paste and the heavy-weight aggregates. In addition, the feature that the content percentage of aggregate particles having particle diameters of 2.5 mm to less than 5 mm is 20 mass % or more prevents the heavy-weight concrete from deteriorating in flowability thereby to ensure a desired workability. This enables to fill the heavy-weight concrete into every corners of the case of counterweight during the vibration forming after roughly filling the case with the heavy-weight concrete. Consequently, the filling factor of the heavy-weight concrete to the case may be effectively improved and the ability of compaction by vibration or the like may also be improved.

The heavy-weight aggregates according to the present invention preferably contain 5 mass % or more of fine aggregate particles having particle diameters of less than 0.075 mm, more preferably within the range of 5 mass % to 10 mass %, and furthermore preferably within the range of 5 mass % to 8 mass %. The feature that such fine aggregate particles are contained with 5 mass % or more may improve or increase the viscosity of cement paste in the heavy-weight concrete. In addition, the above fine aggregate particles have density of 3.5 g/cm$^3$ or more while that of ordinary Portland cement is 3.16 g/cm$^3$, and therefore the density of paste may be increased. As a result, the material segregation is significantly inhibited from occurring between paste and aggregates.

As a natural ore of raw materials for heavy-weight aggregates according to the present invention, barite may be used, for example. Barite has density of approximately 4.0 g/cm$^3$, which is sufficient as heavy-weight aggregates. Heavy-weight aggregates obtained by crushing such barite contain considerable fine aggregate particles having particle diameters of less than 0.075 mm, and therefore the density difference between paste and aggregates may be decreased (density difference: 2.5 g/cm$^3$ or less), thereby to furthermore inhibit the material segregation from occurring between paste and heavy-weight aggregates obtained from barite.

In the case where barite is used as a production raw material for heavy-weight aggregates, it is preferred to use barite from which aggregate particles having particle diameters of 9 mm to 11 mm may be obtained by coarse crushing, of which an average tensile strength is within the range of 4.0 N/mm$^2$ to 10.0 N/mm$^2$, and more preferred is within the range of 4.0 N/mm$^2$ to 8.0 N/mm$^2$. If an average tensile strength of the aggregate particles having diameters of 9 mm to 11 mm to be obtained from barite is within the above ranges, then heavy-weight aggregates may be obtained only by coarsely crushing barite so as to have a desired fine aggregate particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more). Accordingly, a specific particle size adjustment after the coarse crushing may not be required, and therefore the production process of heavy-weight aggregates may be simplified and the production cost of heavy-weight aggregates may be decreased thereby also decreasing the production cost of counterweight as a consequence.

The heavy-weight aggregates according to the present invention may be produced by coarsely crushing natural ore as a raw material for heavy-weight aggregates using a crushing machine (jaw crusher, for example) such that the maximum particle diameter of heavy-weight aggregates to be obtained falls within the range of 20 mm to 70 mm, and preferably within the range of 20 mm to 50 mm.

A particle size adjustment may be performed for the obtained heavy-weight aggregates after coarse crushing of natural ore such that a certain particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more) may be presented. Nonetheless, if the above-mentioned barite is used, then heavy-weight aggregates may be obtained only by coarsely crushing the barite so as to have a desired fine aggregate particle size distribution (the content percentage of aggregate particles having particle diameters of less than 0.15 mm is 20 mass % or more, and the content percentage of aggregate particles having particle diameters of 2.5 mm to less than 5 mm is also 20 mass % or more) and to be contained with 5 mass % or more of fine aggregate particles having particle diameters of less than 0.075 mm. Therefore, a specific process for performing a particle size adjustment after the coarse crushing of natural ore may be omitted, and the production cost of heavy-weight aggregates may be decreased thereby also decreasing the production cost of counterweight as a consequence.

Cement to be contained in the heavy-weight concrete is not particularly limited. For example, ordinary Portland cement, high-early-strength Portland cement, moderate-heat Portland cement, low-heat Portland cement, and other Portland cements; blast furnace cement, fly ash cement, and other blended cements; and cement (eco-cement) comprising plaster and crushed product of baked product produced from municipal bottom ash and/or sewage sludge ash etc. may be used.

It is to be noted that the heavy-weight concrete may be added with admixtures (water reducing agent, antifoam agent etc, for example), if required. It is particularly preferred to add a water reducing agent because the unit water quantity is required to be reduced in order to ensure a high density. Examples of the water reducing agent include lignin-based, naphthalenesulfonic acid-based, melamine-based and polycarboxylic acid-based water reducing agents, AE water reducing agent, high performance water reducing agent, high performance AE water reducing agent, and the like, although not limited to these examples. In addition, if entrainment of air is specifically required to be suppressed in order to ensure a high density of the heavy-weight concrete, it is preferred to add an antifoam agent.

The heavy-weight concrete may be produced through premixing the heavy-weight aggregates and cement, adding water, and thereafter mixing and kneading them in an ordinary method.

Although the water-cement ratio is not particularly limited, preferred is within the range of 30% to 60%, and more preferred is within the range of 35% to 50%. The water-cement ratio being within such ranges allows a high-density heavy-weight concrete to be obtained with less unit water quantity and ensures the workability of the heavy-weight concrete.

Moreover, it is preferred that the fine aggregate ratio (s/a) in the heavy-weight concrete is within the range of 40% to 60%. Furthermore, it is also preferred that the composition of various concrete raw materials is determined such that the slump becomes to be within the range of 0 cm to 3 cm after being mixed and kneaded.

The counterweight 6 according to the present embodiment may be produced through casting the heavy-weight concrete obtained in the above manner into the case 62 via the concrete filling opening 61, and performing compaction and removal of air using arbitrarily a vibration machine such as table vibrator, bar-like vibrator or the like thereby to fill the case 62 with the heavy-weight concrete without clearance or interspace. The content percentage of fine particle components (aggregate particles having particle diameters of less than 0.15 mm) being high in the heavy-weight concrete allows the viscosity of the heavy-weight concrete to be improved or increased, while the content percentage of coarse particle components (aggregate particles having particle diameters of 2.5 mm to less than 5 mm) being high prevents the flowability of the heavy-weight concrete from decreasing. As such, the filling factor of the heavy-weight concrete into the case 62 may be effectively improved thereby to furthermore inhibit, during the vibration forming, the material segregation from occurring between cement paste and the heavy-weight aggregates in the heavy-weight concrete.

The counterweight 6 according to the present embodiment may be arbitrarily adjusted by filling the case with usual concrete or the like in addition to the heavy-weight concrete so as to obtain a weight necessary for the counterweight 6. Alternatively, iron scraps and the like may be put into the case 62 in addition to the heavy-weight concrete. In this case, the heavy-weight concrete according to the present embodiment is sufficiently filled into clearances or interspaces having occurred due to putting such iron scraps and the like into the case 62.

Figure 2:
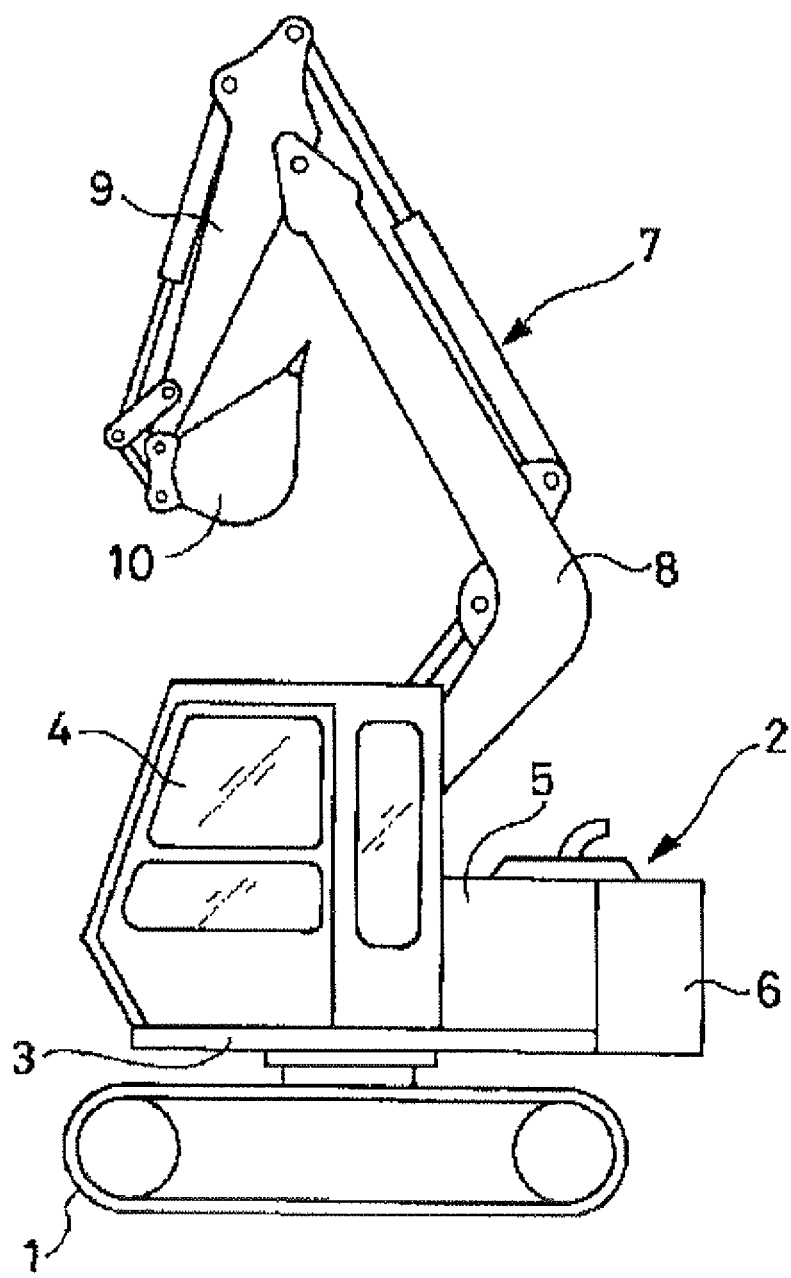
FIG. 2 is a side view illustrating a hydraulic shovel which involves the counterweight according to the embodiment of the present invention.

The counterweight 6 obtained in such a manner is available as a counterweight for construction machineries, such as hydraulic shovels, mobile cranes, bulldozers and the like. More specifically, as shown in FIG. 2, the counterweight 6 may be attached to the rear side of the machinery housing 5 within the upper revolving superstructure 2 of the hydraulic shovel.

As described hereinbefore, the counterweight according to the present embodiment is adapted such that the heavy-weight concrete filled in the case contains heavy-weight aggregates which have a certain particle size distribution, thereby capable of improving or increasing the viscosity of cement paste. Therefore, the counterweight may have the heavy-weight concrete filled into every corners of the case, because the heavy-weight aggregates in the heavy-weight concrete are prevented from settling down during the performance of the vibration forming.

Moreover, it is enough to merely crushing a certain barite in order to obtain heavy-weight aggregates in the heavy-weight concrete to be filled into the counterweight. Therefore, a specific particle size adjustment may be omitted, and production costs of the heavy-weight aggregates and the heavy-weight concrete may be decreased thereby also decreasing the production cost of counterweight.

It is to be noted that the embodiments as explained above are described to facilitate understanding of the present invention and are not described to limit the present invention. Therefore, it is intended that the elements disclosed in the above embodiments include all substitutions, modifications, equivalents and the like to fall within the technical scope of the present invention.

Although the counterweight has been described as being available for construction machineries in the above embodiments, it is not limited to this. The counterweight may be used for elevators, for example.

EXAMPLES

Hereinafter, the present invention will be described in more detail referring to the following examples, though the present invention is not limited to these examples.

<Production of Heavy-Weight Aggregates>

Heavy-weight aggregates were produced through putting barite materials shown in Table 1 into a jaw crusher (production name: Fine jaw crusher, available from Maekawa Kogyosho Co., Ltd.) and coarsely crushing to obtain aggregates with maximum particle diameter of 40 mm.

TABLE 1

| | Type | Note |
|---|---|---|
| Example 1 | Fine aggregate | Barite (i), Face dry density: 4.12 g/cm$^3$ |
| | Coarse aggregate | Barite (i), Face dry density: 4.04 g/cm$^3$ |
| Example 2 | Fine aggregate | Barite (ii), Face dry density: 3.94 g/cm$^3$ |
| | Coarse aggregate | Barite (ii), Face dry density: 3.67 g/cm$^3$ |
| Comparative Example 1 | Fine aggregate | Barite (iii), Face dry density: 4.04 g/cm$^3$ |
| | Coarse aggregate | Barite (iii), Face dry density: 4.20 g/cm$^3$ |
| Comparative Example 2 | Fine aggregate | Barite (i) + (iii), Face dry density: 4.08 g/cm$^3$ |
| | Coarse aggregate | Barite (i) + (iii), Face dry density: 4.12 g/cm$^3$ |
| Comparative Example 3 | Fine aggregate | Barite (ii) + (iii), Face dry density: 3.99 g/cm$^3$ |
| | Coarse aggregate | Barite (ii) + (iii), Face dry density: 3.94 g/cm$^3$ |

Heavy-weight fine aggregates out of the heavy-weight aggregates (Examples 1 and 2, and Comparative Examples 1 to 3) obtained in the above manner were subjected to sieving operation using sieves with nominal dimensions of 0.15 mm to 5.0 mm, and mass ratios (mass %) of aggregates passing through each sieve were measured. In addition, content percentages (mass %) of aggregates particles having particle diameters of less than 0.075 mm in the above heavy-weight aggregates (Examples 1 and 2, and Comparative Examples 1 to 3) were also obtained. Results are shown in Table 2.

TABLE 2

| | Nominal dimension (mm) | | | | | | Content percentage of aggregate particles having particle diameters of less than 0.075 mm (mass %) |
|---|---|---|---|---|---|---|---|
| | 5.0 | 2.5 | 1.2 | 0.6 | 0.3 | 0.15 | |
| Example 1 | 95 | 73 | 58 | 51 | 43 | 29 | 5.2 |
| Example 2 | 98 | 67 | 45 | 35 | 27 | 21 | 5.8 |
| Comparative Example 1 | 100 | 94 | 77 | 52 | 29 | 13 | 4.1 |
| Comparative Example 2 | 98 | 83 | 68 | 52 | 36 | 21 | 4.7 |
| Comparative Example 3 | 99 | 79 | 61 | 44 | 28 | 17 | 4.9 |

As shown in Table 2, with regard to heavy-weight fine aggregates of Examples 1 and 2, content percentages of aggregate particles having particle diameters of less than 0.15 mm were 20 mass % or more and content percentages of aggregate particles having particle diameters of 2.5 mm to less than 5 mm were also 20 mass % or more, while both content percentages were less than 20 mass % for heavy-weight fine aggregates of Comparative Example 1. In turn, with regard to heavy-weight aggregates of Comparative Example 2, content percentage of aggregate particles having particle diameters of 2.5 mm to less than 5 mm was less than 20 mass %, and with regard to heavy-weight aggregates of Comparative Example 3, content percentage of aggregate particles having particle diameters of less than 0.15 mm was less than 20 mass %. Furthermore, as shown in Table 2, with regard to heavy-weight fine aggregates of Example 1 and Example 2, content percentages of fine aggregate particles having particle diameters of less than 0.075 mm were 5 mass % or more, while the same content percentages were less than 5 mass % for heavy-weight fine aggregates of Comparative Examples 1 to 3.

<Tensile Strength Measurement Test for Heavy-Weight Aggregates>

Heavy-weight aggregates (Example 1, Example 2, and Comparative Example 1) obtained in the above manner were subjected to a point load test in conformity to the Japanese Geotechnical Society Standards (JGS 3421-2005) "Point Load Test Method for Rocks". In this exemplary test, tensile strengths (N/mm$^2$) were measured for the purpose of obtaining more easily aggregate strengths. In addition, tensile strengths of metal slag based aggregate (product name: DSM aggregate, available from Taiheiyo Cement Corporation, as Comparative Example 4), limestone (Comparative Example 5) and tight sands (Comparative Example 6) were similarly measured for comparison. Note that the aggregates of Comparative Examples 4 to 6 were produced in the similar manner as Examples 1 and 2 and Comparative Examples 1 to 3 except for the maximum particle diameters of aggregates obtained being 20 mm. Results are shown in FIG. 3 and FIG. 4.

Figure 3:
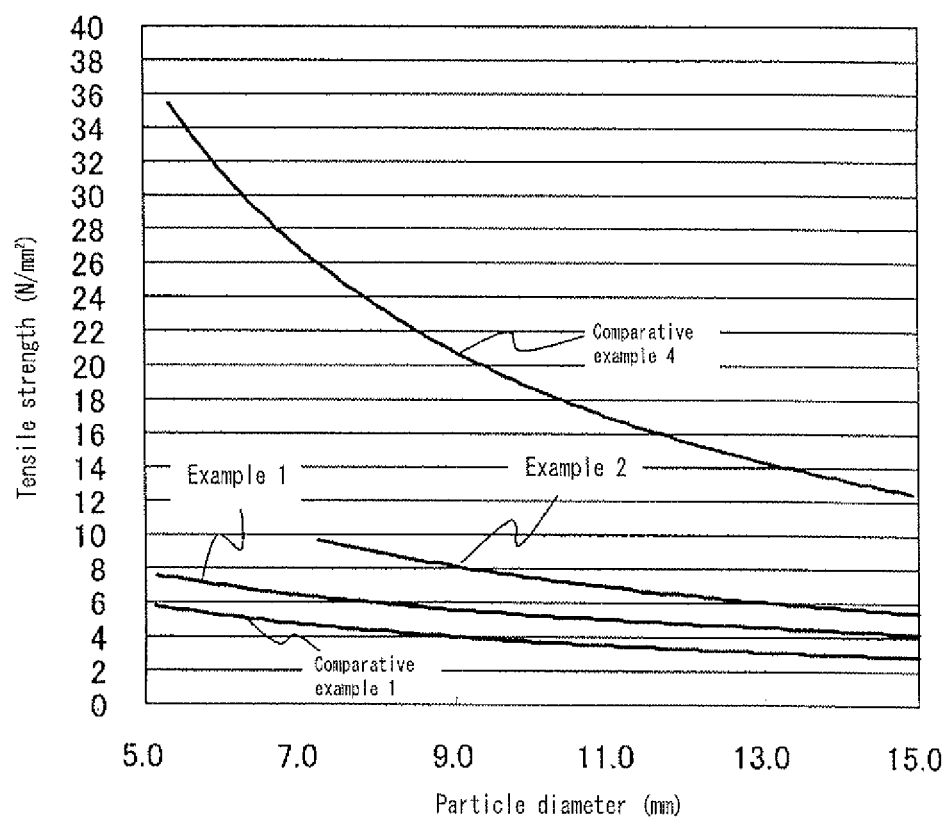
FIG. 3 is a graph illustrating results of tensile strength test for aggregates in terms of Example 1, Example 2, Comparative Example 1 and Comparative Example 4.
Figure 4:
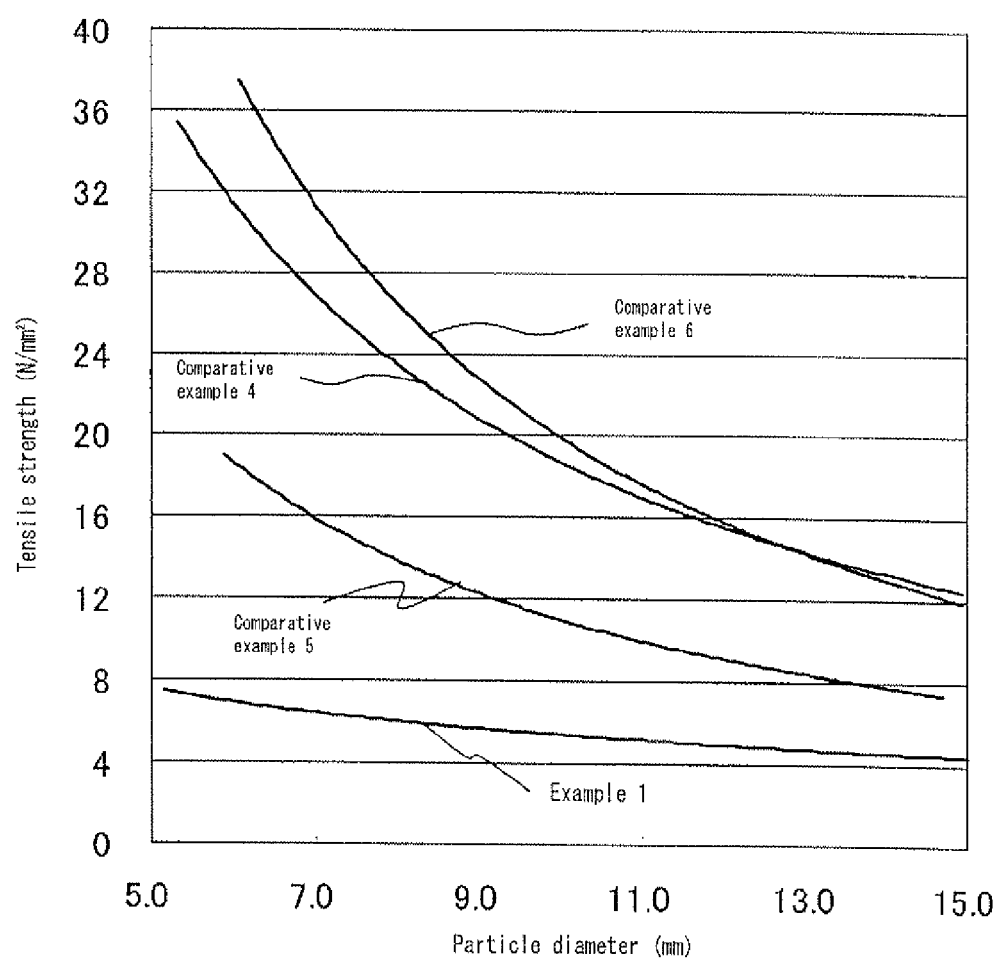
FIG. 4 is a graph illustrating results of tensile strength test for aggregates in terms of Example 1 and Comparative Examples 4 to 6.

As shown in FIG. 3 and FIG. 4, the average tensile strengths of aggregates having particle diameters of 9 mm to 11 mm out of aggregates according to Example 1 and Example 2 were 4.0 N/mm$^2$ to 10.0 N/mm$^2$, while the average tensile strength of aggregates having particle diameters of 9 mm to 11 mm out of aggregates according to Comparative Example 1 was less than 4.0 N/mm$^2$. From this, it was confirmed that, if using barite from which aggregate particles with particle diameters of 9 mm to 11 mm would be obtained to have an average tensile strength of 4.0 N/mm$^2$ to 10.0 N/mm$^2$ out of aggregates obtained by coarse crushing, then it might be enabled to produce heavy-weight fine aggregates containing 20 mass % or more of aggregate particles having particle diameters of less than 0.15 mm and 20 mass % or more of aggregate particles having particle diameters of 2.5 mm to less than 5 mm and heavy-weight aggregates containing such heavy-weight fine aggregates without specifically performing a particle size adjustment and the like. Moreover, it was confirmed that, if using barite from which aggregate particles with particle diameters of 9 mm to 11 mm would be obtained to have an average tensile strength of 4.0 N/mm$^2$ to 10.0 N/mm$^2$ out of aggregates obtained by coarse crushing, then it might be enabled to produce heavy-weight aggregates containing 5 mass % or more of fine aggregate particles having particle diameters of less than 0.075 mm.

Moreover, as shown in FIG. 3 and FIG. 4, it was also confirmed that tensile strengths of heavy-weight aggregates according to Example 1 and Example 2 were within the range of 4.0 N/mm$^2$ to 10.0 N/mm$^2$ substantially not depending on particle diameters thereof, while tensile strengths of heavy-weight aggregates according to Comparative Examples 4 to 6 were increased in accordance with decreasing of particle diameters thereof. In either case of Comparative Example 4 to 6, fine aggregates with aggregate diameters of 5 mm or less had less content percentages of being crushed into fine particles and were almost uniformly distributed within the extent of 5 mm or less, and the content percentage of aggregate particles with particle diameters of less than 0.15 mm was not to reach 20 mass %. From these, it may be considered that, if using natural ore (barite, for example) from which aggregates may be obtained to have tensile strengths within a certain range (4.0 N/mm$^2$ to 10.0 N/mm$^2$) substantially not depending on particle diameters thereof, then heavy-weight aggregates having a desired particle size distribution may be produced without specifically performing a particle size adjustment.

<Production of Heavy-Weight Concrete>

Heavy-weight concretes were produced by mixing and kneading compositions shown in Table 3 each consisting of heavy-weight aggregates (heavy-weight fine aggregate S and heavy-weight coarse aggregate G) obtained in such a manner as the above, ordinary Portland cement C (available from Taiheiyo Cement Corporation, density: 3.16 g/cm$^3$), and water W. Note that each composition was determined so as to have a slump value of 0 (zero) cm to 10 cm measured in conformity to JIS-A1101 for the heavy-weight concretes of Examples 1 and 2 and Comparative Examples 1 to 3. Also note that water for adjustment W' was added to each of heavy-weight concretes of Comparative Examples 1 to 3 because of lacking in water for mixing and kneading so as to obtain comparable slumps with those of Examples 1 and 2.

TABLE 3

| | W/C | s/a | Air | Unit quantity (kg/m$^3$) | | | | | Unit volume mass |
|---|---|---|---|---|---|---|---|---|---|
| | (%) | (%) | (%) | W | W' | C | S | G | (kg/L) |
| Example 1 | 42 | 45 | 2.0 | 120 | 0 | 286 | 1426 | 1709 | 3.541 |
| Example 2 | | | | 120 | 0 | 286 | 1363 | 1552 | 3.321 |
| Comparative Example 1 | | | | 120 | 15 | 286 | 1398 | 1777 | 3.581 (3.528) |
| Comparative Example 2 | | | | 120 | 15 | 286 | 1412 | 1743 | 3.561 (3.508) |
| Comparative Example 3 | | | | 120 | 15 | 286 | 1381 | 1667 | 3.454 (3.403) |

\* In the table, W' represents "additional water quantity for adjustment due to lack of water for mixing and kneading".
\* Each "parenthetic numeral" for unit volume mass in the table represents a value after corrected for the addition of water for adjustment.

<Measurement of VC (Vibrating Consolidation) Value and Measurement of Compaction Ratio>

VC (Vibrating Consolidation) values were measured in conformity to JSCE-F507 "Consistency test method for ROD concrete" for the heavy-weight concretes (Examples 1 and 2 and Comparative Examples 1 to 3) obtained in such a manner as the above. Results are shown in Table 4. Note that VC value is intended to mean a required time for concrete to be compacted under vibration, and the smaller the value is the better the workability thereof is estimated to be.

In addition, unit volume masses of the heavy-weight concretes after being compacted in the above test were measured, and compaction ratio (%) was calculated as percentage of each unit volume mass to each designed value. Results are additionally shown in Table 4. Furthermore, presence or absence of separation of cement was determined by visual observation on each heavy-weight concrete after being compacted in such a manner as the above. Results are also additionally shown in Table 4.

TABLE 4

|  | Consistency test | | | |
| --- | --- | --- | --- | --- |
|  | Slump (cm) | VC value (sec) | Compaction ratio (%) | Separation of cement paste |
| Example 1 | 0.0 | 12.6 | 99.2 | Absent |
| Example 2 | 1.0 | 10.5 | 99.1 | Absent |
| Comparative Example 1 | 0.5 | 16.5 | 90.7 | Present |
| Comparative Example 2 | 0.0 | 18.6 | 98.6 | Absent |
| Comparative Example 3 | 1.0 | 9.6 | 96.0 | Slightly Present |

As shown in Table 4, it is understood that the VC value of Comparative Example 1 is higher than the VC Values of Example 1 and Example 2 i.e. the flowability of heavy-weight concrete of the former is lower than those of the latter cases. Thus, both heavy-weight concretes of Example 1 and Example 2 were confirmed to provide good workability performances. In addition, as apparent from visual observation after compacting, separation of cement paste was significantly observed on the heavy-weight concrete of Comparative Example 1, thus the material segregation was confirmed to occur between cement paste and heavy-weight aggregates.

In turn, the compaction ratio of heavy-weight concrete of Comparative Example 1 was lower by 2% or more than those of Example 1 and Example 2. The filling factor is considered to be decreased in the heavy-weight concrete of Comparative Example 1 because the occurrence of the material segregation causes heavy-weight aggregates with large specific gravity to settle down toward the bottom portion of the container (case). On the contrary, in terms of the heavy-weight concretes having high compaction ratios as Example 1 and Example 2, filling factors were confirmed to be capable of being efficiently improved or increased because the material segregation was prevented from occurring during vibration forming. Consequently, according to the heavy-weight concretes of Example 1 and Example 2, it is enabled to fill the case of counterweight with heavy-weight concrete into every corners thereof.

In addition, the heavy-weight concrete with furthermore high VC value as Comparative Example 2 was confirmed to have a poor flowability during vibration forming. It may be considered that the heavy-weight concrete of Comparative Example 2 is of relatively fine aggregates as a whole thereby deteriorating the flowability of the heavy-weight concrete because the content percentage of aggregate particles having particle diameters of 2.5 mm to less than 5 mm is less than 20 mass % in the heavy-weight fine aggregate. Therefore, it may be considered as being difficult to fill the case with the heavy-weight concrete into every corners thereof even if roughly filling the case of the counterweight and performing the vibration forming.

Although the heavy-weight concrete of Comparative Example 3 represents a comparable VC value with those of heavy-weight concretes of Example 1 and Example 2 to provide a good workability, it is considered that the material segregation may slightly occur to cause heavy-weight aggregates with relatively large particle diameters to settle down thereby decreasing the compaction ratio because the content percentage of aggregate particles having particle diameters of less than 0.15 mm is less than 20 mass % in the heavy-weight aggregate.

INDUSTRIAL APPLICABILITY

The counterweight according to the present invention is useful as a counterweight for construction machineries, such as hydraulic shovels.

EXPLANATION OF REFERENCE NUMERALS

6; counterweight

62; case

The invention claimed is:

1. A counterweight comprising a case and a heavy-weight concrete filled in the case, wherein
the heavy-weight concrete contains at least a heavy-weight fine aggregate and a heavy-weight coarse aggregate,
the heavy-weight fine aggregate contains 20 mass % or more of aggregate particles having particle diameters of less than 0.15 mm and 20 mass % or more of aggregate particles having particle diameters of 2.5 mm to less than 5 mm, and
the heavy-weight fine aggregate and the heavy-weight coarse aggregate contain 5 mass % or more of fine aggregate particles having particle diameters of less than 0.075 mm.

2. The counterweight as recited in claim 1, wherein the heavy-weight fine aggregate and the heavy-weight coarse aggregate are obtained by crushing barite such that maximum particle diameter becomes to be within a range of 20 mm to 70 mm.

3. The counter weight as recited in claim 1, wherein water cement ratio of the heavy-weight concrete is within a range of 30% to 60%.

4. The counterweight as recited in claim 1, wherein a whole or a part of the heavy-weight fine aggregate and the heavy-weight coarse aggregate is barite.

5. The counterweight as recited in claim 4, wherein an average tensile strength of aggregate particles having particle diameters of 9 mm to 11 mm to be obtained by crushing the barite is within a range of 4.0 N/mm$^2$ to 10.0 N/mm$^2$.

6. A counterweight comprising a case and a heavy-weight concrete filled in the case, the heavy-weight concrete comprising a mixture of a heavy-weight fine aggregate and a heavy-weight coarse aggregate, wherein:
20 mass % or more of aggregate particles contained in the heavy-weight fine aggregates have particle diameters of less than 0.15 mm,
20 mass % or more of aggregate particles contained in the heavy-weight fine aggregates have particle diameters of 2.5 mm to less than 5 mm, and 5 mass % or more of fine aggregate particles contained in the heavy-weight fine aggregates and the heavy-weight coarse aggregates have particle diameters of less than 0.075 mm.

7. The counterweight as recited in claim 6, wherein the heavy-weight fine aggregate and the heavy-weight coarse aggregate are obtained by crushing barite such that maximum particle diameter becomes to be within a range of 20 mm to 70 mm.

8. The counter weight as recited in claim 6, wherein water cement ratio of the heavy-weight concrete is within a range of 30% to 60%.

9. The counterweight as recited in claim 6, wherein a whole or a part of the heavy-weight fine aggregate and the heavy-weight coarse aggregate is barite.

10. The counterweight as recited in claim 9, wherein an average tensile strength of aggregate particles having particle diameters of 9 mm to 11 mm to be obtained by crushing the barite is within a range of 4.0 N/mm$^2$ to 10.0 N/mm$^2$.

* * * * *